United States Patent
Hirata et al.

(10) Patent No.: US 8,082,724 B2
(45) Date of Patent: Dec. 27, 2011

(54) COMBUSTING SYSTEM, REMODELING METHOD FOR COMBUSTING SYSTEM, AND FUEL INJECTION METHOD FOR COMBUSTING SYSTEM

(75) Inventors: Yoshitaka Hirata, Naka-gun (JP); Shohei Yoshida, Hitachiota (JP); Tatsuya Sekiguchi, Hitachi (JP); Hiroshi Inoue, Mito (JP)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 12/277,324

(22) Filed: Nov. 25, 2008

(65) Prior Publication Data

US 2009/0139241 A1 Jun. 4, 2009

(30) Foreign Application Priority Data

Nov. 29, 2007 (JP) ................................. 2007-308160

(51) Int. Cl.
*F02C 3/00* (2006.01)
(52) U.S. Cl. .................. 60/39.37; 60/39.281; 60/39.094
(58) Field of Classification Search ............... 60/39.094, 60/39.281, 39.37, 39.821, 734, 739, 742, 60/746, 790
See application file for complete search history.

(56) References Cited

U.S. PATENT DOCUMENTS

| | | | | |
|---|---|---|---|---|
| 2,543,366 A * | 2/1951 | Haworth et al. | ........... | 60/39.094 |
| 2,619,162 A * | 11/1952 | Feilden | ........................... | 60/740 |
| 2,722,803 A * | 11/1955 | Travers | ........................ | 60/39.37 |
| 2,979,898 A * | 4/1961 | Ward | ........................ | 60/39.37 |
| 3,001,366 A * | 9/1961 | Shutts | ........................ | 60/39.821 |
| 3,811,274 A * | 5/1974 | Calderon | ........................ | 60/800 |
| 4,249,372 A * | 2/1981 | White | ............................. | 60/796 |
| 5,265,413 A * | 11/1993 | Cannon et al. | .................. | 60/800 |
| 2008/0275619 A1* | 11/2008 | Sasao et al. | .................. | 701/100 |

FOREIGN PATENT DOCUMENTS

| | | |
|---|---|---|
| EP | 1 793 165 A2 | 6/2007 |
| JP | 5-187271 A | 7/1993 |
| JP | 10-121986 | 5/1998 |
| JP | 2001-153363 A | 6/2001 |
| JP | 2007-155170 A | 6/2007 |

* cited by examiner

*Primary Examiner* — Louis Casaregola
*Assistant Examiner* — Phutthiwat Wongwian
(74) *Attorney, Agent, or Firm* — Mattingly & Malur, PC (57) ABSTRACT

The present invention improves the reliability of a combusting system including multiple combustors and improves an environmental performance thereof. The invention includes a device that delays the start time of fuel injection from a fuel nozzle of a combustor including a ignitor from the start time of fuel injection from a fuel nozzle of the combustor not including the ignitor.

5 Claims, 8 Drawing Sheets

COMBUSTING SYSTEM, REMODELING METHOD FOR COMBUSTING SYSTEM, AND FUEL INJECTION METHOD FOR COMBUSTING SYSTEM

BACKGROUND OF THE INVENTION

1. Field of the Invention

The present invention relates to a combusting system, a remodeling method for the combusting system, and a fuel injection method for the combusting system.

2. Description of the Related Art

Japanese Unexamined Patent Application Publication No. 10-121986 (Patent Publication 1) discloses a gas turbine including multiple combustors. Generally, gas turbines of the type including multiple combustors are each configured such that all adjacent combustors disposed annularly along the perimeter of the gas turbine are fluidly connected to one another through a cross fire tube. The cross fire tube allows combustion gases to flow through the inside thereof by making use of the inter-combustor pressure difference. Of the multiple combustors, one or two combustors are each provided with a ignitor that generates electrical spark.

Starting of the gas turbine causes the rotation speeds of a compressor to be increased with external energy, thereby causing air to be introduced into the combustor. Thereafter, upon generation of an ignition instruction signal, sparking is started by the ignitor, a fuel control valve is opened, and the fuel is supplied concurrently to all combustors. Then, the combustor including the ignitor is first ignited. Upon ignition, the pressure difference occurs between interior spacings of internal cylinders of the ignited ignitor and an un-ignited combustor. Hence, combustion gases at high temperature enter the un-ignited combustor, and the un-ignited combustor is responsively ignited with thermal energy generated thereby. This operation is performed sequentially in the adjacent combustors, and all the combustors are ignited.

However, with a gas turbine of the above-described type including multiple combustors, there occur problems such as described below during the ignition of the combustors.

In the configuration including multiple combustors, the ratio between fuel and air necessary for ignition ("ignition fuel-air ratio," herebelow) is relatively higher in ignition using thermal energy of combustion gases entering from the adjacent combustor ("cross fire ignition," herebelow), as compared to the air-to-fuel ratio in ignition in the presence of or with the ignitor ("spark plug ignition," herebelow). Hence, in a gas turbine combustor in which the fuel supply timing is identical in each of all combustors, even when high temperature combustion gases enter the adjacent combustor from the combustor ignited with the ignitor, a necessary amount of fuel for the cross fire ignition is not supplied. As a result, ignition failure can occur.

In particular, in many cases, in the event of ignition of the ignitor-equipped combustor, a large volume of combustion gases is caused to enter the adjacent combustor due to an abrupt pressure rise in the combustor, and then ignition occurs. Hence, the time required until the occurrence of ignition of all the combustors is about several seconds. As such, it is considered that the timing of ignition of the ignitor-equipped combustor and the timing of reaching of the adjacent un-ignited combustor to a target fuel flow amount greatly influence.

SUMMARY OF THE INVENTION

The present invention is to improve reliability and environmental performance of a combusting system including multiple combustors.

According to one aspect of the present invention, there is provided a combusting system including a plurality of combustors each including a fuel pipe that supplies fuel to a fuel nozzle, and a fuel purge system connected to the fuel pipe, wherein adjacent ones of the plurality of combustors are interconnected through a cross fire tube, and some of the plurality of combustors each include a ignitor; and a device for delaying fuel injection from the combustion nozzle of the combustor including the ignitor from fuel injection from the combustion nozzle of the combustor not including the ignitor.

According to another aspect of the present invention, there is provided a combusting system including a plurality of combustors each including a fuel pipe that supplies fuel to a fuel nozzle that injects the fuel, and a fuel purge system connected to the fuel pipe, wherein adjacent ones of the plurality of combustors are interconnected through a cross fire tube, and some of the plurality of combustors each include a ignitor. A volume of a flow passage of the fuel flowing through the fuel pipe extending from a connection portion between the fuel pipe and the fuel purge system to a discharge portion that discharges purged fuel to the outside in the combustor including the ignitor is greater than the volume of a flow passage of the fuel flowing through the fuel pipe in the identical section in the combustor not including the ignitor.

According to another aspect of the present invention, there is provided a combusting system including a plurality of combustors each including a fuel pipe that supplies fuel to a fuel nozzle, a fuel purge system that discharges the fuel residual in the fuel pipe to an outside of the fuel pipe, and a connection portion between the fuel pipe and the fuel purge system, wherein adjacent ones of the plurality of combustors are interconnected through a cross fire tube, and some of the plurality of combustors each include a ignitor; and a flow divider that distributes fuel to a plurality of the pipes, the fuel being supplied from a fuel tank. A volume of a flow passage of the fuel flowing through the fuel pipe extending from a connection portion between the fuel pipe and the fuel purge system to a discharge portion that discharges a purged fuel to the outside in the combustor including the ignitor is greater than the volume of a flow passage of the fuel flowing through the fuel pipe in the identical section in the combustor not including the ignitor.

In this case, the combusting system may further include a three-way valve provided upstream of a connection portion between the fuel pipe of and the fuel purge system of the combustor including the ignitor, wherein a tank for storing purged fuel is connected to one end of the three-way valve.

Further, the fuel nozzle in each of the combustor including the ignitor and the combustor not including the ignitor may be a pilot burner of a diffusion combustion type, wherein a premixer is disposed on a circumference of the pilot burner.

According to another aspect of the present invention, there is provided a combusting system including a plurality of combustors each including a fuel pipe that supplies fuel to a fuel nozzle, a fuel purge system that discharges the fuel residual in the fuel pipe to an outside of the fuel pipe, and a connection portion between the fuel pipe and the fuel purge system, wherein adjacent ones of the plurality of combustors are interconnected through a cross fire tube, and some of the plurality of combustors each include a ignitor; and a control valve and a control device that are provided midway of the fuel pipe in the combustor including the ignitor, the control valve being provided to regulate a fuel flow amount, and the control device being provided to perform on-off control of the control valve in accordance with atmospheric temperature and humidity.

According to another aspect of the present invention, there is provided a remodeling method for a combusting system including a plurality of combustors each including a fuel pipe that supplies fuel to a fuel nozzle, and a fuel purge system that is connected to the fuel pipe and that discharges the fuel residual in the fuel pipe from the fuel pipe, wherein adjacent ones of the plurality of combustors are interconnected through a cross fire tube, and some of the plurality of combustors each include a ignitor. The remodeling method replaces the fuel pipe so that a volume of a flow passage of the fuel flowing through the fuel pipe extending from a connection portion between the fuel pipe and the fuel purge system to a discharge portion that discharges purged fuel to the outside in the combustor including the ignitor is greater than the volume of a flow passage of the fuel flowing through the fuel pipe in the identical section in the combustor not including the ignitor.

According to another aspect of the present invention, there is provided a fuel injection method for a combusting system including a plurality of combustors each including an a fuel nozzle that injects fuel into a combustion chamber, wherein adjacent ones of the plurality of combustors are interconnected through a cross fire tube, and some of the plurality of combustors each include a ignitor. The fuel injection method includes a first step for starting injection of the fuel from the fuel nozzle of the combustor not including the ignitor; and a second step for starting injection of the fuel from the fuel nozzle of the combustor including the ignitor after the first step.

In this case, the fuel injection method may further include a third step for causing ignition of the combustor not including the ignitor after the elapse of predetermined time period.

According to the present invention, the reliability of a combusting system including a plurality of combustors can be improved, and an environmental performance thereof can be improved.

BRIEF DESCRIPTION OF THE DRAWINGS

In the accompanying drawings,

FIG. 4 includes FIGS. 4A and 4B showing characteristics of a fuel injection flow amount with respect to time variations in the comparative example and the first embodiment;

DETAILED DESCRIPTION OF THE PREFERRED EMBODIMENTS

Embodiments of the present invention will be described below with reference to the drawings.

First Embodiment

A first embodiment will be described herebelow with reference to FIGS. 1 to 4 and 8. The present embodiment is an example of application to a gas turbine as a combusting system.

Figure 1:
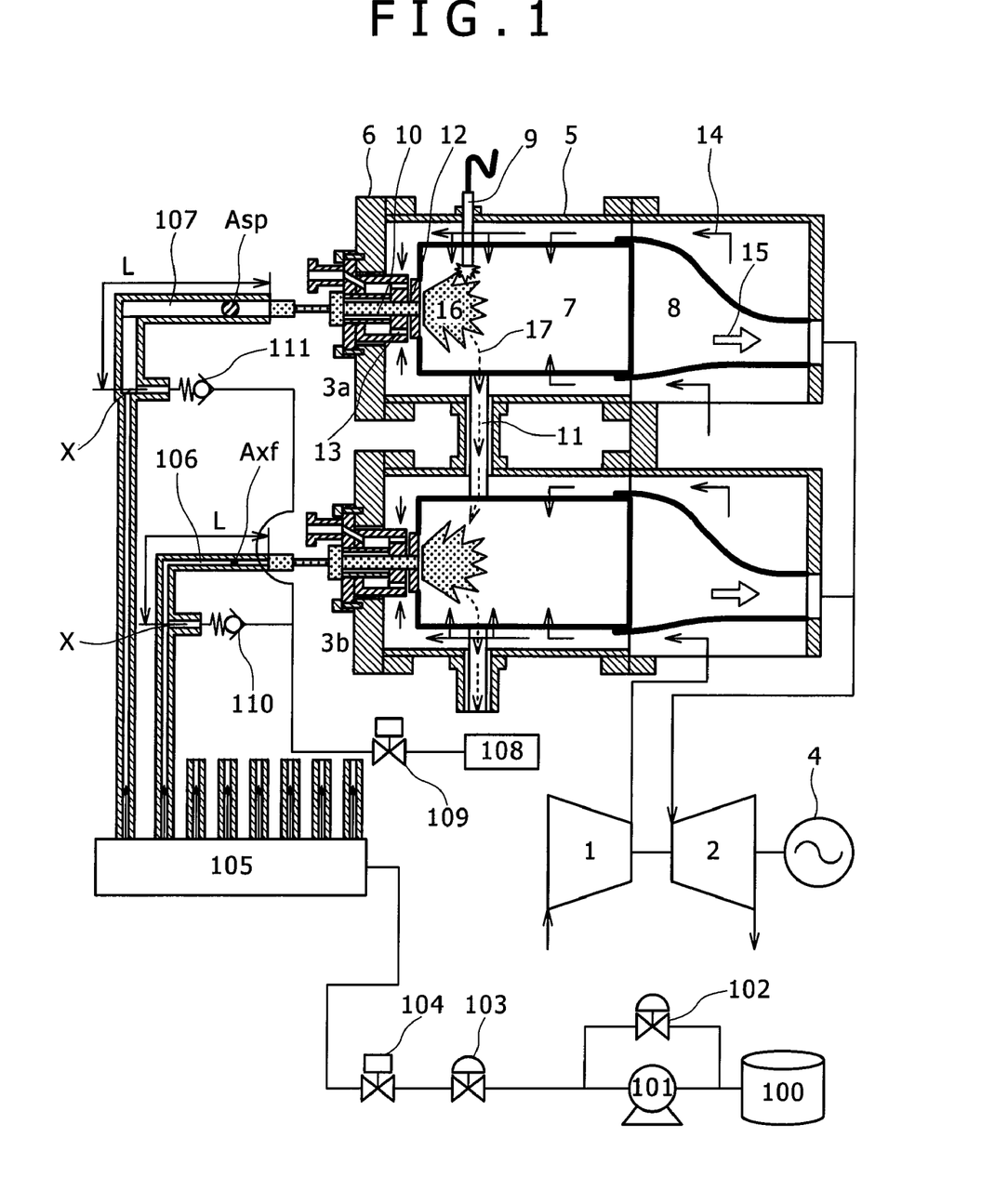
FIG. 1 is a schematic configuration view showing the overall configuration of a gas turbine plant, including a side cross sectional view of the configurations of gas turbine combustors of a first embodiment of the present invention.

FIG. 1 is a schematic configuration view showing the overall configuration of a gas turbine plant including gas turbine combustors of the first embodiment. With reference to FIG. 1, the gas turbine plant primarily includes a compressor 1, multiple combustors 3a and 3b, and a turbine 2. The compressor 1 compresses air to thereby generate high pressure combustion air. The combustors 3a and 3b each mix a combustion air 14 and fuel introduced from the compressor 1. A turbine 2 receives a combustion gas 15 generated in the combustors 3a and 3b and introduced therefrom. In the schematic configuration view of FIG. 1, only two of ten cans or ten combustors (described further below) are representatively shown. Shafts of the compressor 1 and the turbine 2 fluidly connected to one another.

Combustors 3a and 3b each include an outer casing 5 and an end cover 6 that hermetically enclose components including an combustor liner 7, a transition piece 8, a liquid fuel nozzle 10, a swirler 12, and a spark plug 9. The combustor liner 7 causes premixed combustion of the fuel and the combustion air 14 from the compressor 1. The transition piece 8 guides the combustion gas 15 generated in the combustor liner 7 to the turbine 2. The liquid fuel nozzle 10 is provided on an upstream side of the combustor liner 7, and atomizes the liquid fuel. The swirler 12 swirls the combustion air 14. The spark plug 9 serves as a ignitor that causes ignition in the combustor 3a.

The combustion air 14 supplied from the compressor 1 travels through an airflow channel configured from the outer casing 5, the combustor liner 7, and the transition piece 8. Then, the combustion air 14 is introduced into the combustor liner 7 from, for example, a combustion air hole and cooling air hole provided in a wall face of the combustor liner 7 and an air hole provided in the swirler 12. In the combustor liner 7, the combustion air 14 and the fuel are mixed together into a gaseous mixture, and the gaseous mixture burns or combusts. The combustion gas 15 generated through combustion is injected into the turbine 2 through the transition piece 8, thereby to drive the turbine 2. Thereby, a generator 4 fluidly connected to the turbine 2 is driven, thereby to perform power generation.

A fuel supply system is configured to include a fuel tank 100, a fuel pump 101, a pressure regulating valve 102, a fuel shut-off valve 103, a flow control valve 104, and a flow divider 105. Fuel pipes 106 and 107 fluidly connecting to the respective combustors 3b and 3a are provided downstream of the flow divider 105. Further, a fuel purge system for preventing coking phenomena occurrable in the fuel pipe and fuel nozzle is fluidly connected midway of the respective fuel pipe 106, 107. The fuel purge system is configured from a purge air compressor 108, a purge air shut-off valve 109, and respective check valve 110, 111.

The liquid fuel is boosted by the fuel pump 101, and is set to a predetermined pressure through the pressure regulating valve 102 disposed in a bypass line of the fuel pump 101. The liquid fuel thus boosted is passed through the fuel shut-off valve 103 and the flow control valve 104 and is then distributed to the respective combustors through the flow divider 105. In this manner, the liquid fuel is supplied to the respective combustors 3a and 3b.

Figure 8:
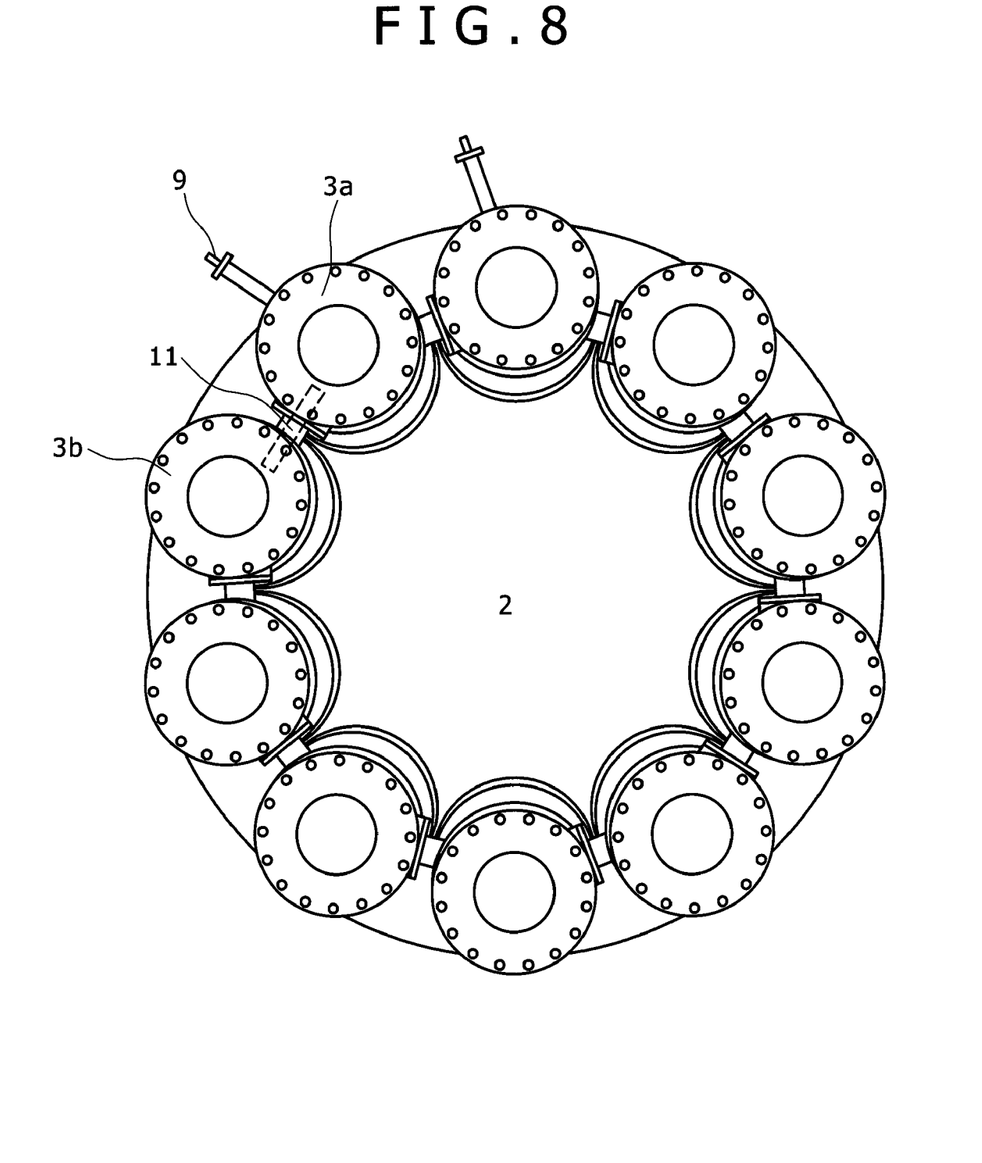
FIG. 8 is a schematic view of the gas turbine combustor (shown in FIG. 1) in the case where an end cover (6) is viewed along a turbine rotation axis direction.

Generally, as shown in FIG. 8, gas turbine combustors, which are configured from multiple cans, are disposed annularly along the circumferential direction of the turbine 2. FIG. 8 is a schematic view of the gas turbine combustors (shown in FIG. 1) in the case where an end cover 6 is viewed along a turbine rotation axis direction. Through fluid connection between the combustors 3a and 3b, the interiors of the combustor liners 7 are fluidly connected together by a cross fire tube 11. The spark plug 9 is provided to each of two combustors. In an ordinary case, while a ignitor (spark plug) is provided to one or each of some cans of combustors of all combustors, it is provided to one or each of two cans of combustors in many cases. Further, in the case where combustors are configured from multiple cans, it is preferable that the same combustion state is attained in each of or respective combustors 3a and 3b. Hence, generally, components such as a fuel nozzle 10 and a swirler 12 are used so that the flow characteristic of the fuel nozzle 10 and the structure of the swirler 12 is identical in the respective combustor.

FIRST COMPARATIVE EXAMPLE

Figure 2:
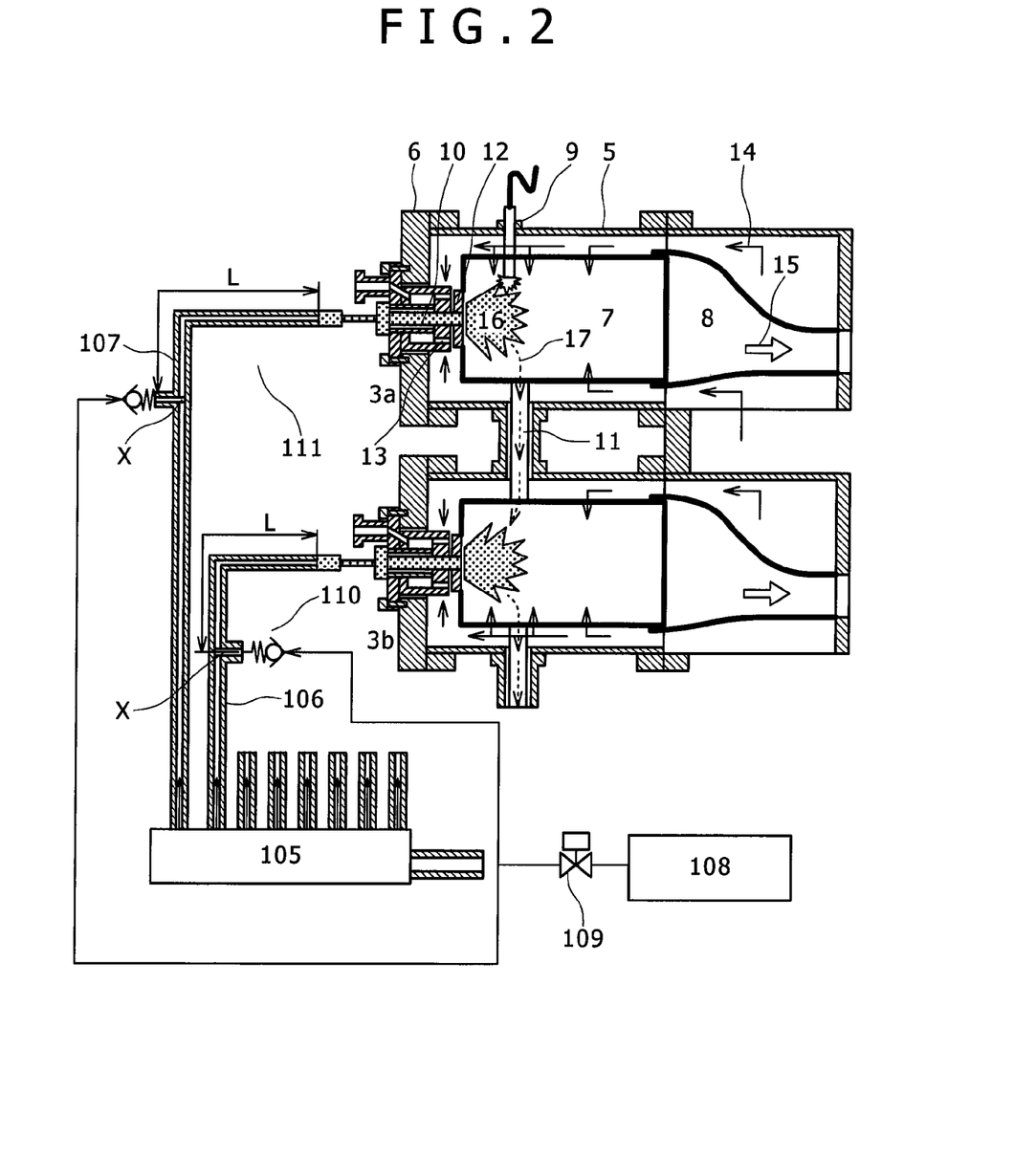
FIG. 2 is a side cross sectional view showing the configurations of combustors of a first comparative example.

FIG. 2 is a view showing the overall configurations of combustors, a fuel supply system, and a fuel purge system of a first comparative example. The fuel supply system in each of all the combustors is identical in cross-sectional area size, so that the cross-sectional area size of the respective fuel pipe 106, 107 fluidly connected to the respective combustor 3a, 3b is identical. Further, also the fuel purge system fluidly connected to the fuel pipe of the respective combustor 3a, 3b to discharge the liquid fuel into the combustor liner 7 is fluidly connected to an identical position (point X) spaced apart by L (length) from fuel supply inlet port of the fuel nozzle 10.

Ignition operation in each of the combustors 3a and 3b (or expressed in such manner as "respective combustor 3a, 3b," herebelow) of the first comparative example configured as described above will be described herebelow.

The compressor 1 is speeded up to a predetermined ignition rotation speed in response to external energy or, more specifically, a dynamo-electric motor electrical motor. Thereby, the combustion air 14 from the compressor 1 supplied to the combustors 3a and 3b. Thereafter, upon transmission of an ignition instruction signal, electrical sparking is started by the spark plug 9, and open operations of the fuel shut-off valve 103 and the flow control valve 104 are performed, whereby the fuel equally distributed by the flow divider 105 is supplied to the combustors 3a and 3b. Thereafter, ignition in the combustor 3a is effected by electrical sparking of the spark plug 9 (the ignition herebelow will be refer to as "spark plug ignition"), in which a flame 16 is formed. In this event, in operative association with the ignition in the combustor 3a, the interior pressure of the combustor liner 7 abruptly increases, causing a pressure difference from that in the un-ignited combustor 3b. In accordance with the pressure difference, a high temperature combustion gas 17 flows through the cross fire tube 11 from the combustor 3a to the combustor 3b. Then, ignition in the combustor 3b is effected with thermal energy of the high temperature combustion gas 17 (the ignition herebelow will be referred to as "cross fire ignition").

Concurrently, in order to inhibit coking phenomena possibly occurring in the fuel pipe 106, 107 and the fuel nozzle 10 after the gas turbine has stopped, the fuel residual in the fuel pipe 106, 107 and the fuel nozzle 10 is discharged with the purge air into the fuel nozzle 10 from the fuel inlet port of the fuel nozzle 10, as described above. Hence, the fuel nozzle inlet port corresponds to a discharge portion that discharges the purged fuel to the outside. After purging of the fuel, a fuel flow passage of the fuel pipe 106, 107 and the fuel nozzle 10, which are located further downward of the connection portion (point X) between the fuel purge system and the fuel pipe is replaced with the purge air. Hence, in the case where the cross-sectional area size of the fuel passage of the fuel flowing through the fuel pipe and the pipe length to the fuel supply inlet ports of the fuel nozzles 10 from the connection portion (point X) is identical in the respective combustor 3a, 3b. Hence, the volume of purge air residual in the interior of the respective fuel pipe is caused to be identical after completion of fuel purge. Hence, in the event of reignition after the gas turbine has stopped, the timing of fuel injection from the fuel nozzle 10 is identical in the respective the combustor.

Figure 4A:
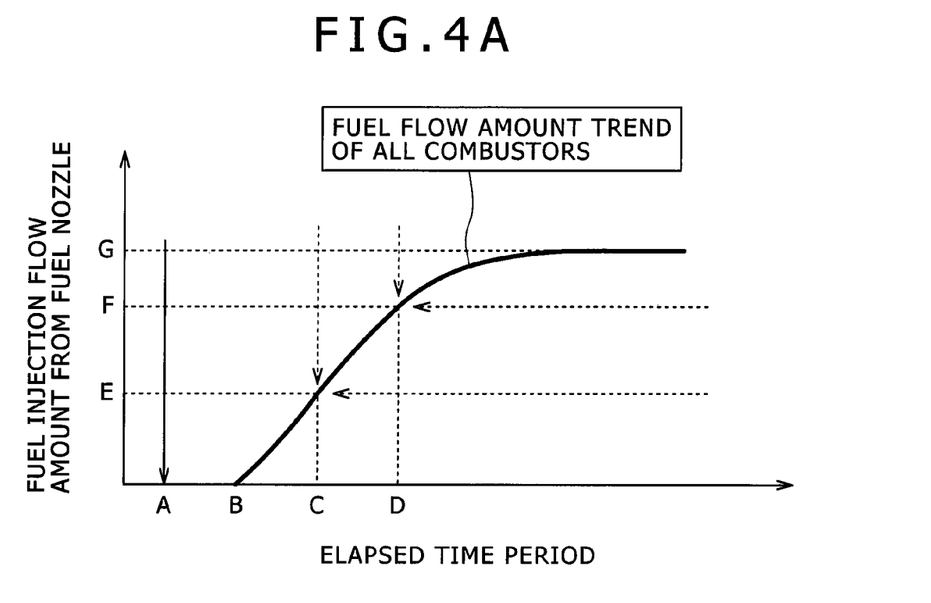

FIG. 4A shows an elapsed time period of the fuel flow amount in the combustor 3a, 3b of the first comparative example. In the figure, the horizontal axis indicates the elapsed time period, and the vertical axis indicates the fuel injection flow amount. Further, in the figure, a point A indicates a transmission point of the ignition instruction signal, a point B indicates a fuel injection start point from the fuel nozzle 10, and a point G indicate a final reaching point in fuel injection amount at the ignition time. Further, a point E indicates a fuel flow amount necessary for the spark plug ignition, and a point F indicates a fuel flow amount necessary for the cross fire ignition. Generally, in many cases, the fuel flow amount necessary for ignition indicates characteristics that the amount for the cross fire ignition is greater (E<F) as compared with the amount for the spark plug ignition. Points C and D indicate reaching times (at the points E and F).

As described above, in the case of the first comparative example, fuel injection of all the combustors is started with the same timing. Hence, in the respective combustor, there are indicated the transitions of the fuel injection flow amounts as shown in the figure, and only the combustor 3a is ignited with the spark plug 9 at the point C of the elapsed time period. However, in the case of the combustor 3b not including the spark plug 9, the fuel necessary for the cross fire ignition is not supplied, so that there is a probability that ignition cannot be effected even when the high temperature combustion gas 17 enters from the combustor 3a.

Ordinarily, in the case of the cross fire ignition, many cases take place where, in the event of ignition in the combustor 3a, the interior pressure of the combustor abruptly increases following expansion of the combustion gas, and ignition is effected. Hence, there is a probability that a sufficient amount of thermal energy is not transferred from the combustor 3a even when the fuel flow amount in the combustor 3b reaches the point F, thereby causing an ignition failure.

As the fuel for supply to the combusting system, liquid fuel or gas fuel is used. In particular, with the liquid fuel being used, when an ignition failure occurs, uncombusted fuel is deposited on the inner side of the combustor liner. When ignition is attempted in the state where the liquid fuel is deposited on the inner side of the combustor liner, the liquid fuel deposited on the combustor liner is affected by heat, thereby to evaporate causing white smoke. White smoke produces smell, so that, for a combusting system installed in an urban area, it is important to prevent white smoke from occurring from the combusting system in consideration of peripheral environments.

SECOND COMPARATIVE EXAMPLE

Figure 3:
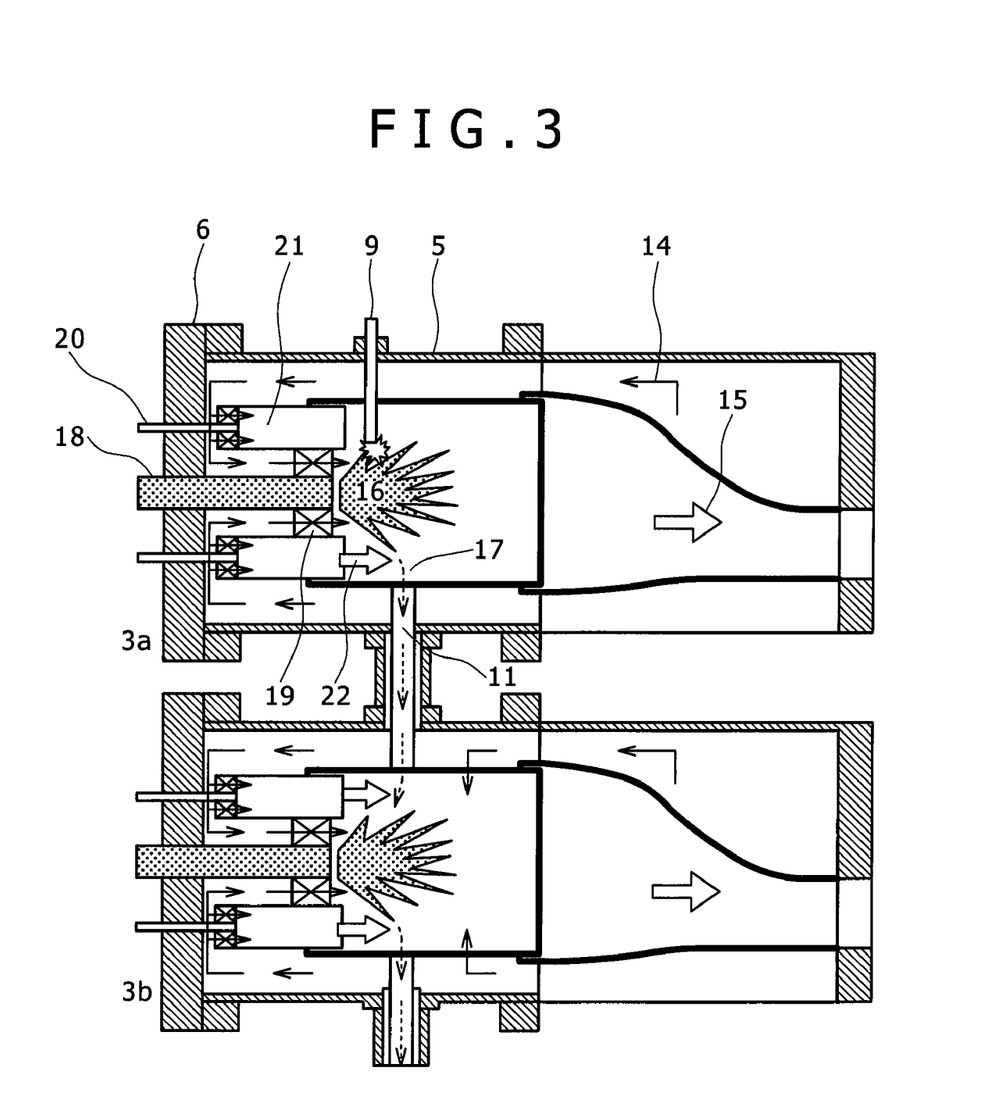
FIG. 3 is a side cross sectional view showing the configurations of combustors of a second comparative example.

Further, FIG. 3 shows a second comparative example including a premixer 21 that reduces the amount of NOx emissions (or "NOx emission amount," herebelow). In each of the combustors 3a and 3b, a pilot burner 19 of a diffusion combustion type that is excellent in combustion stability is disposed in the center of the combustor, in which the premixer 21 is disposed in the circumference thereof.

In the combustor 3a, 3b thus configured, since ignition is effected with the pilot burner 19 located in the center, flowing of the high temperature combustion gas 17 is inhibited by an airflow 22 falling from the premixer 21 located in the circumference thereof. Hence, as compared to the first comparative example, it is difficult to cause cross fire with the central pilot burner 19, therefore increasing the probability of causing an ignition failure.

As such, in the present embodiment (example), the cross-sectional area size of a flow passage of the fuel flowing through the fuel pipe in the section extending to the discharge portion that discharges the purged fuel to the outside from the connection portion between the fuel pipe and the fuel purge system in the combustor including the ignitor is greater than the cross-sectional area size of a flow passage of the fuel flowing through the fuel pipe in the identical section in the combustor not including the ignitor. More specifically, it is preferable that a cross-sectional area Asp of the fuel pipe 107 in the section extending to the fuel inlet port of the fuel nozzle 10 from the connection portion (point X) between the fuel purge system and the fuel pipe in the fuel supply system of the combustor 3a including the spark plug 9 is greater than an cross-sectional area size Axf of the fuel pipe 106 for the combustor 3b not including the spark plug.

Suppose that the distance to the fuel inlet port of the fuel nozzle 10 from the connection portion (point X) between the fuel purge system and the fuel pipe is identical for each of the combustor 3a including the spark plug 9 and the combustor 3b not including the spark plug. In this case, the fuel pipe 107 for the combustor 3a is greater than the fuel pipe 106 for the combustor 3b in the volume of the flow passage of the fuel flowing through the fuel pipe. The volume of the flow passage of the fuel is represented by the product of the multiplication between the length of the pipe and the cross-sectional area size of the flow passage of the fuel flowing through the pipe. Hence, in the event of initial ignition in the gas turbine combustor, the period of time until the fuel pipe 107 is filled with the liquid fuel is longer than that in the fuel pipe 106. Accordingly, the timing of injection of the fuel from the fuel nozzle 10 of the combustor 3a is set to be later as compared to that in the combustor 3b.

Figure 4B:
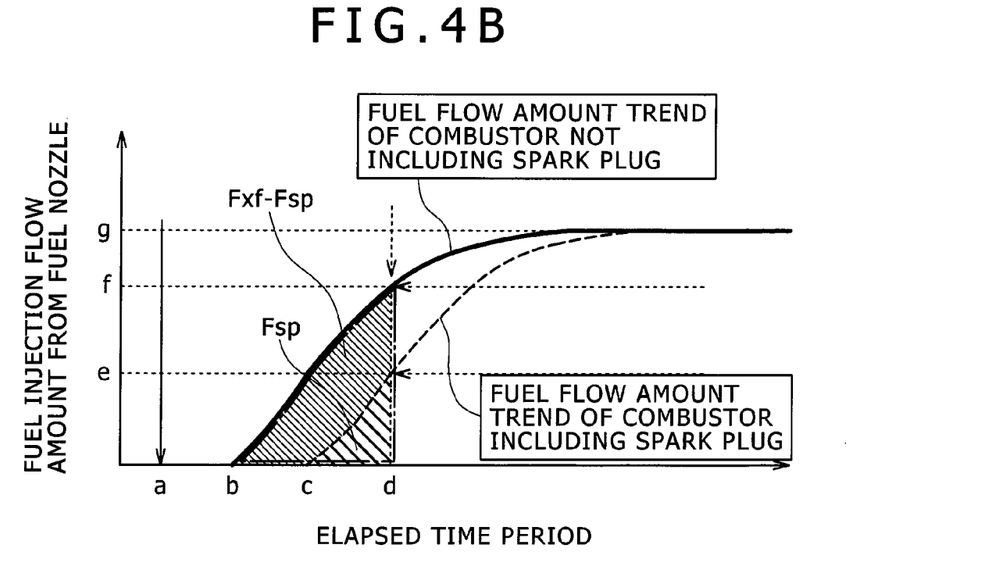

FIG. 4B shows the transition of the fuel injection flow amount from the fuel nozzle 10 relative to the time variation in the event described above. To begin with, the ignition instruction signal is transmitted at a point a. A time period from the point a to a point b is a time period until the fuel pipe 106 for the combustor 3b not including the spark plug is filled with the liquid fuel. Then, at the point b, the fuel is injected from the fuel nozzle 10 of the combustor 3b. In the case of the combustor 3a including the spark plug 9, the volume of the flow passage of the fuel flowing through the fuel pipe 107 is greater than in the case of the combustor 3b not including the spark plug. Hence, the time period until the fuel pipe 107 is filled with the liquid fuel is longer than that in the case of the combustor 3b, so that fuel injection is started at a point c.

In the present embodiment, the flow characteristic of the fuel nozzle 10 in the respective combustor is identical. Hence, the rate of an increase in the fuel injection flow amount at and after the point c in the combustor 3a including the spark plug 9 is substantially the same as the rate of an increase in the fuel injection flow amount at and after the point b in the combustor 3b not including the spark plug. In this event, where a fuel flow amount necessary for the spark plug ignition is an point e, and a fuel flow amount necessary for the cross fire ignition is a point f, the time when the combustor 3a effecting the spark plug ignition reaches a point e becomes substantially the same at a point d as the time when the combustor 3b effecting the cross fire ignition reaches an point f.

More specifically, the present invention can be configured to include a device (means) for delaying a start time of fuel injection. The section delays a start time (point c) of fuel injection from a fuel nozzle included in a combustor including a ignitor from a start time (point b) of fuel injection from a fuel nozzle included in a combustor not including the ignitor. In this case, in synchronism with momentary entrance of the high temperature combustion gas 17 into the combustor 3b from the combustor 3a ignited with the spark plug 9, an amount of the fuel necessary for the cross fire ignition is already supplied even in the combustor 3b. Hence, even in the combustor 3b not including the spark plug, the cross fire ignition can be stably effected, and the characteristics of the cross fire ignition can be improved in comparison to the comparative examples. Further, even with no nozzle provided to the fuel pipe extending from the flow divider 105 to a fuel nozzle 13, the fuel injection flow amount reaches the points substantially the same time (point d) in the combustor including the ignitor and the combustor not including the ignitor. Hence, control can be prevented from becoming complex.

Further, according to the present embodiment, the length (L) to the fuel nozzle inlet port from the connection portion (point X) between the fuel pipe and the fuel purge system of the respective combustor is identical. In many cases, the length (L) is identical in each of existing gas turbine combustors. Hence, the volume of the flow passage of the fuel in the pipe can be changed, and remodeling can easily be accomplished in the manner that the cross-sectional area size of the flow passage of the fuel is changed by replacing the pipe having the length (L).

Further, the flow divider 105 for distributing the fuel is provided on the upstream side of the respective combustor 3a, 3b. Because of the flow divider 105 provided, the fuel tank does not have to be provided for the respective combustor, and fuel injection timing does not have to be regulated. Hence, the fuel supply system can be formed into a simple configuration.

Further, in the configuration of the embodiment of the present invention, the fuel purge system for discharging the fuel resident in the fuel pipe into the fuel pipe in the event of stopping of fuel supply is fluidly connected to the fuel pipe (point X). After the gas turbine has stopped, the fuel resident in the interior of the respective fuel pipe 106, 107 and the fuel nozzle 10 is replaced with the purge air. Hence, the purge air enters the interiors of the respective fuel pipe 106, 107 on the side downstream of the connection portion (point X) between the fuel purge system and the fuel pipe. Here, the volumes of the purge air entered the respective combustors 3a and 3b will be described. A larger volume of the purge air enters the combustor 3a including the ignitor in correspondence to the difference in the volume of flow passage of the fuel extending from the connection portion (point X) to the discharge portion that discharges the purged fuel to the outside. Hence, event in the event of restarting after the gas turbine has stopped, the start time of injection from the fuel nozzle 10 in the combustor 3a including the ignitor can be delayed from that in the combustor 3b not including the ignitor. Thus, the present embodiment of the present invention is effective for improving ignition properties even in gas turbine combustors including liquid fuel combustors in which start and stop operations are frequently performed.

Further, the discharge portion for discharging the purged fuel to the outside is the fuel inlet port of the fuel nozzle, and hence the purged fuel is discharged into the combustor liner 7.

In this case, a storage tank for separately storing the purged fuel does not have to be provided, so that the cost can be reduced.

Further, even in the respective combustors 3a and 3b, of the second comparative example employing the premix combustion method, as shown in FIG. 3, in the case where the fuel supply system of the embodiment of the present invention is employed, the size of the cross-sectional area Asp can be changed. Thereby, the fuel injection start time of the respective combustor 3a, 3b can be set to the cross fire ignition with optimal conditions, thereby enabling the improvement of the ignition properties.

Here, the size of the cross-sectional area Asp of the fuel pipe 107 including the ignitor is defined by using FIG. 4B. With reference to FIG. 4B, the volume level of the fuel necessary for the combustor 3b not including the spark plug to reach the point f, which is shown in the figure, is represented by Fxf (portion surrounded by a single-dotted chain line in the figure). Similarly, the volume level of the fuel necessary for the combustor 3a including the spark plug to reach the point e is represented by Fsp (boldly hatched portion in the figure). Further, the cross-sectional area size of the fuel pipe 106 of the combustor 3b is represented Axf, and the length of the pipe extending to the fuel inlet port of the fuel nozzle 10 from the connection portion (point X) between the fuel pipe and the fuel purge system is represented by L. In this case, the fuel injection start time described above can be set in the manner that the difference between the pipe volumes of the fuel pipes 107 and 106 is caused to be identical to the difference (thinly hatched portion) between Fsp and Fxf. More specifically, the difference can be defined by Equation (1).

$$Asp=(Fxf-Fsp)/L+Axf \qquad (1)$$

Then, the start time of fuel injection from the fuel nozzle of the combustor including the ignitor is preferably delayed by a predetermined time period or more from the start time for starting fuel injection from the fuel nozzle of the combustor not including the ignitor. This is preferable to enable the ignition to be effected in the combustor 3b not including the ignitor at the free point d at which ignition failure does not occur.

Further, the combustors of the embodiment of the present invention is not only capable of acquiring the above-described effects as combustors mounted in a gas turbine newly installed, but is also capable of obtaining similar effects as combustors mounted in an existing gas turbine only by changing the fuel pipe 107 for the combustor 3a including the spark plug 9. Hence, the combustors are widely applicable.

Second Embodiment

Figure 5:
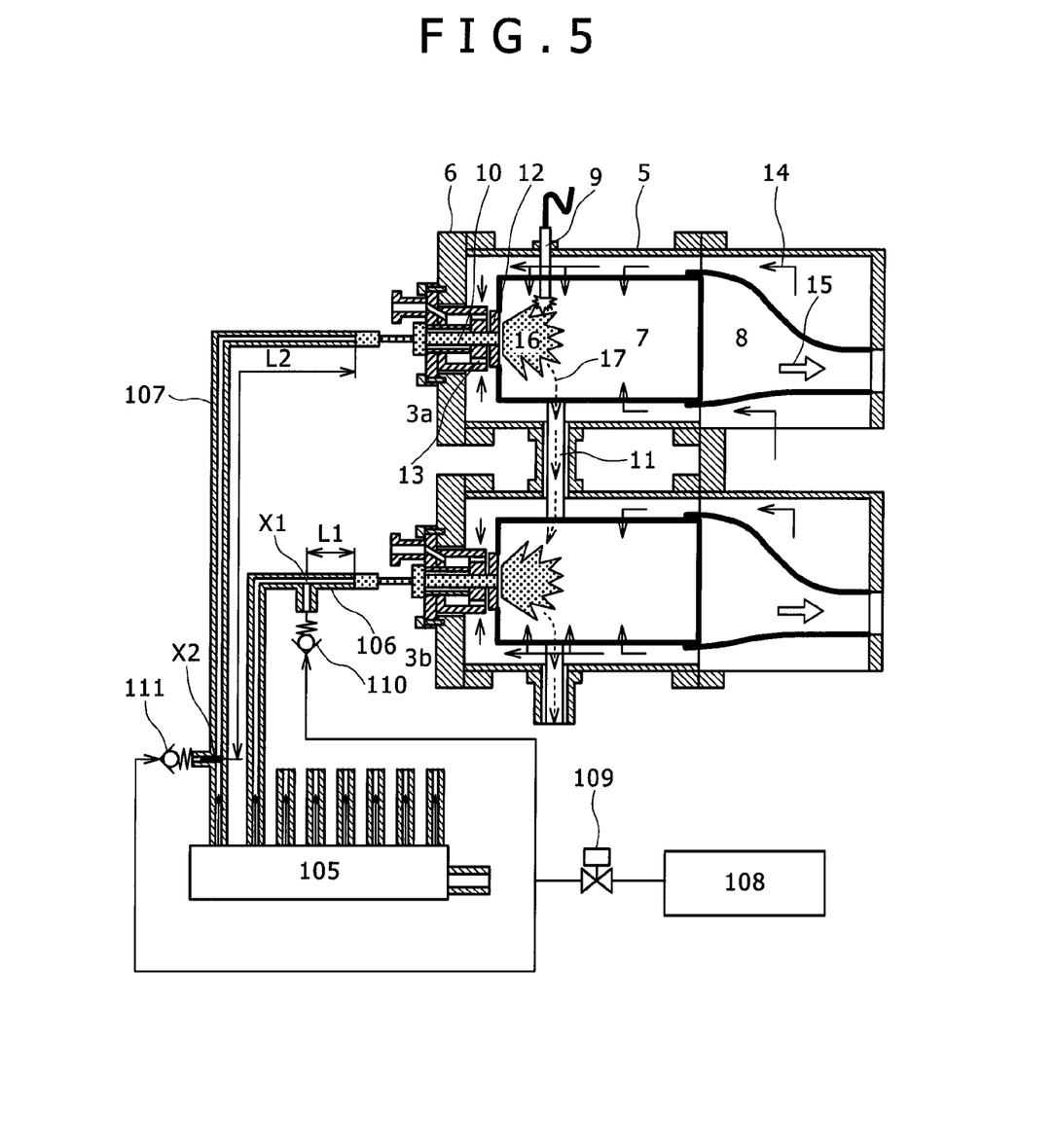
FIG. 5 is a side cross sectional view of a gas turbine combustor of a second embodiment of the present invention.

A second embodiment will be described with reference to FIG. 5.

Basic components of combustors of the present embodiment are similar to those of the first embodiment. However, in the present embodiment, the connection portion (X point) between the fuel pipe and the fuel purge system is formed further upstream of the point X1. Thereby, a length L2 of the fuel pipe 107 from a connection portion (point X2) of the fuel purge system of the combustor 3a including the spark plug 9 is designed to be longer than a length L1 of the fuel pipe 106 from a connection portion (point X1) of the fuel purge system of the combustor 3b not including the spark plug to the fuel nozzle inlet port.

According to the embodiment of the present invention thus configured, the volume of the fuel pipe 107 for the combustor 3a including the ignitor can be made to be greater than the volume of the fuel pipe 106 for the combustor 3b not including the ignitor, so that effects similar to those of the first embodiment can be expected.

Further, in the first embodiment, the cross-sectional area size of the fuel pipe 107 is enlarged midway of the flow passage and is reduced at the inlet port of the fuel nozzle 10. Hence, during the fuel purge after the gas turbine has stopped, the fuel can remain in the enlarged or reduced portion of the flow passage.

However, in the configuration of the present embodiment, since the cross-sectional area size of the fuel pipe 107 is uniform in any portion, the fuel can be prevented from remaining therein during the fuel purge. Hence, as compared to the first embodiment, combustors with even higher reliability can be provided.

Third Embodiment

Figure 6:
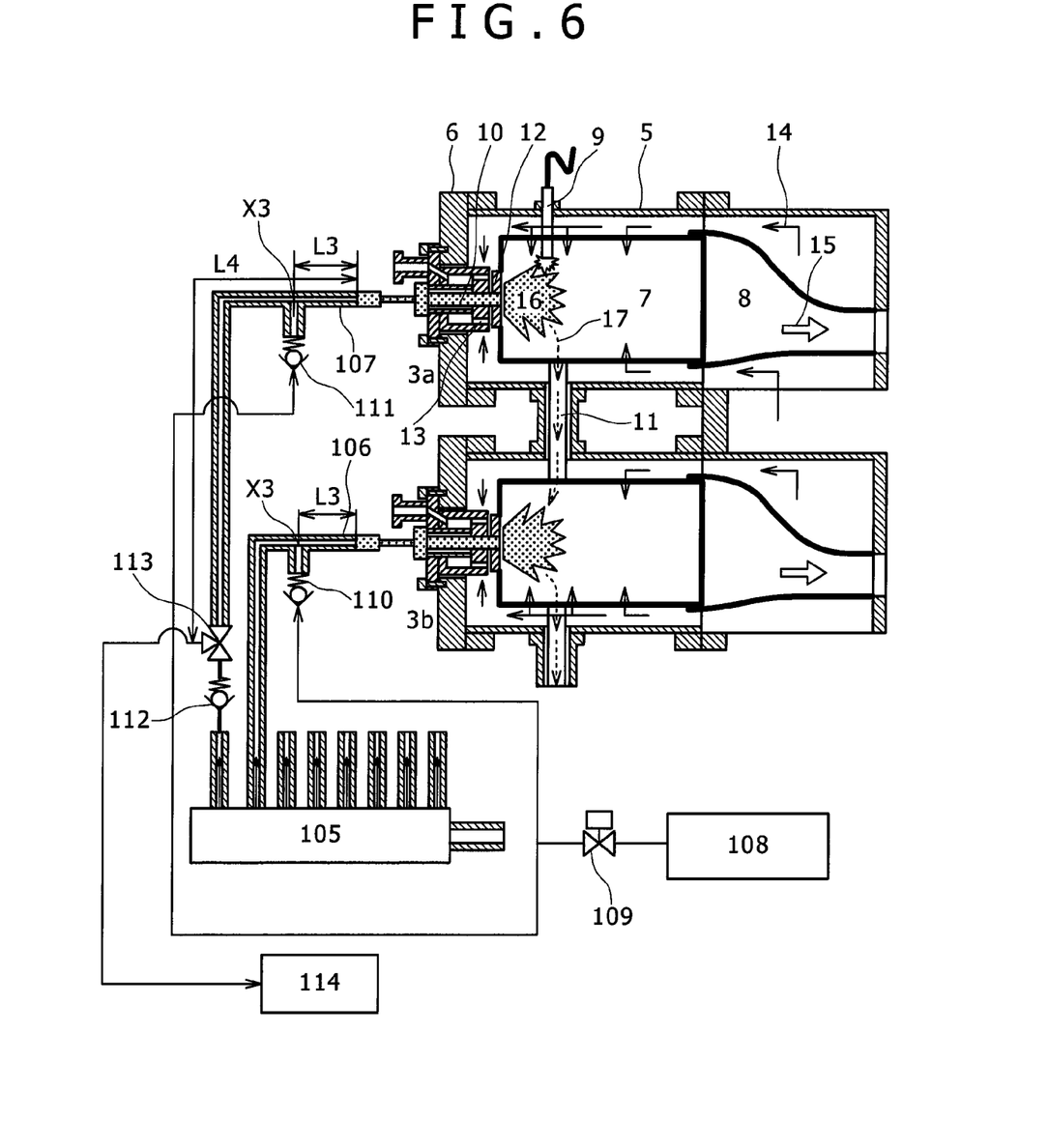
FIG. 6 is a side cross sectional view of a gas turbine combustor of a third embodiment of the present invention.

A third embodiment of the present invention will be described with reference to FIG. 6.

Similarly as in the second embodiment, in combustors of the present embodiment, the cross-sectional area sizes of the fuel pipes 106 and 107 of all the combustors 3a and 3b are identical to one another. In the present embodiment, however, a difference from the second embodiment is that also the positions of connection of the fuel purge system to the fuel pipes are identical to one another. Here, let L3 be the distance from the connection portion between the fuel purge system and the fuel pipe to the fuel nozzle inlet port. Further in the present embodiment, a three-way valve 113 is provided only to the fuel pipe 107 of the combustor 3a including the spark plug 9 on an upstream side spaced apart by L4 (L3<L4) from the fuel nozzle inlet port. Further, in the configuration, a check valve 112 for preventing backflow to the flow divider 105 is provided upstream of the three-way valve 113, and further, one end of the three-way valve 113 (that is, the upstream side of the three-way valve 113) is fluidly connected to a purge fuel tank 114.

In the respective embodiments 1 and 2, the volume of the flow passage of the fuel flowing through the fuel pipe 107 extending to the fuel nozzle inlet port from the connection portion between the fuel purge system and the fuel pipe for the combustor 3a is set greater than the volume of the flow passage of the fuel flowing through the fuel pipe 106 in the identical portion for the combustor 3b. Hence, when fuel purge is executed after gas turbine has stopped, a large amount of the fuel is discharged into the combustor liner of the combustor 3a. When fuel purge is executed immediately after the gas turbine has stopped, since the internal temperature of the combustor liner is high, the purged fuel evaporates by being affected by the heat, thereby emitting a large amount of colored, smelling exhaust smoke. Concurrently, the purged fuel is deposited on, for example, the combustor liner 7 and the swirler 12, in which coking phenomena can occur to the extent of plugging cooling air holes of the combustor liner 7 and air holes of the swirler 12. Hence, preferably, the amount of the purged fuel discharging into the combustor liner 7 of the respective combustor 3a, 3b is as small as possible.

In comparison, however, according to the configuration of the present embodiment, the three-way valve 113 operates so that, after the gas turbine has stopped, the fuel pipe 107 in the section extending from the connection portion (point X3) between the fuel purge system and the fuel pipe 107 is fluidly connected to the three-way valve 113. Hence, the fuel residual in the fuel pipe 107 downstream of the connection portion (point X3) for the combustor 3a is discharged into the combustor liner of the combustor 3a, and the fuel residual on the side upstream of the connection portion (point X3) is discharged with the purge air into the purge fuel tank 114. As such, two discharge portions for discharging the purged fuel are provided, in which one is the fuel nozzle inlet port and the other is the three-way valve 113.

Further, even when leakage occurs in the three-way valve 113 thereby causing the fuel to be compressed to the side of the flow divider 105, backflow of the fuel can be prevented by the check valve 112.

According to the present embodiment, in the combustor including the ignitor, the volume of the flow passage of the fuel flowing through the fuel pipe extending from the connection portion between the fuel purge system and the fuel pipe can be caused to be smaller than that in the above-described embodiment. Hence, when the purge air is supplied, the amount of the fuel to be discharged into the combustor liner of the combustor 3a can be reduced, and hence the occurrence of exhaust smoke can be restrained, an environmentally friendly combusting system can be provided. Further, in the event of ignition, effects similar to those of the first and second embodiments can be obtained, and hence a highly reliable combusting system can be provided.

Fourth Embodiment

Figure 7:
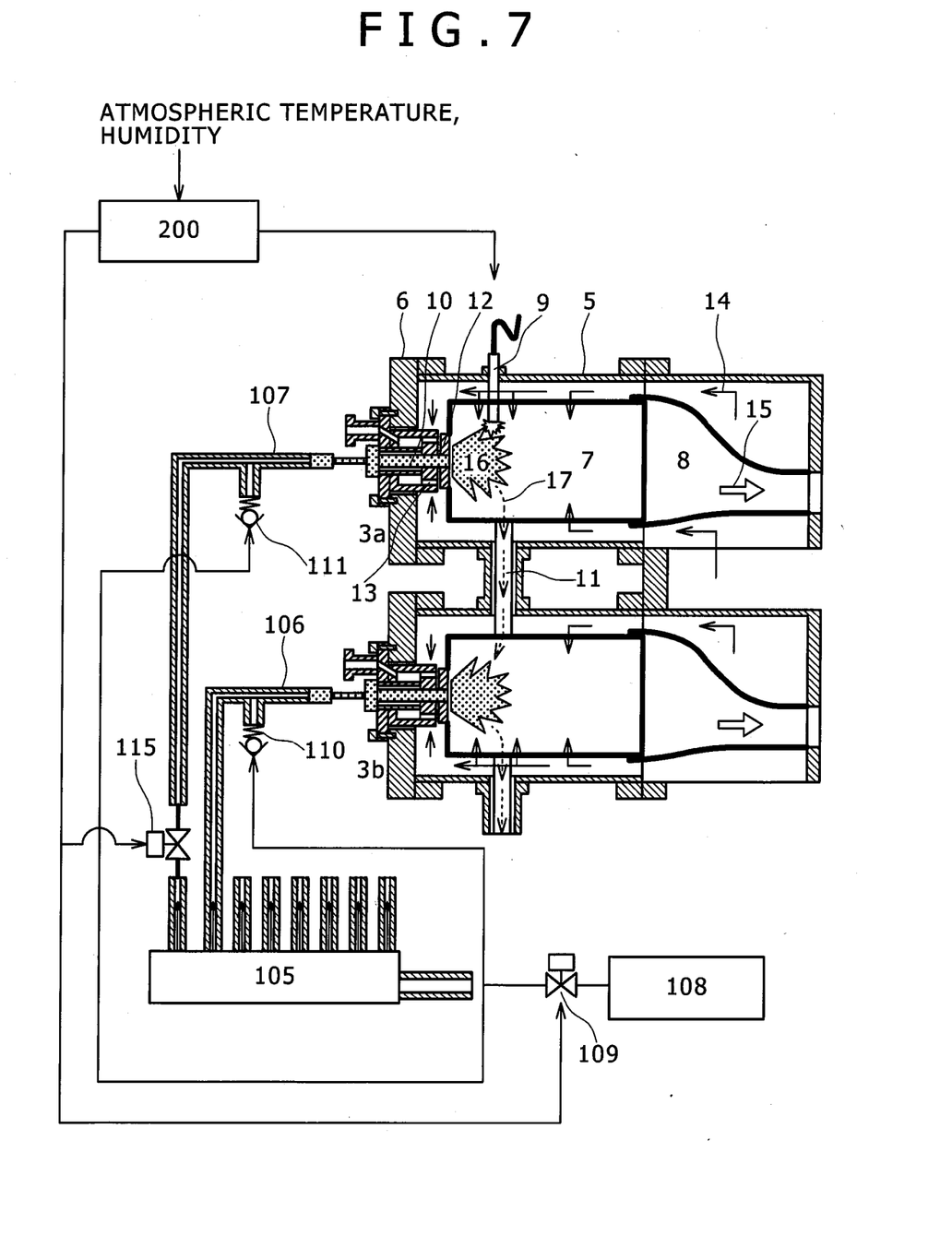
FIG. 7 is a side cross sectional view of a gas turbine combustor of a fourth embodiment of the present invention.

A fourth embodiment of the present invention will be described with reference to FIG. 7. Combustors of the present embodiment are similar to those of the each of the first to third embodiments, except that a control valve 115 is provided midway of the fuel pipe 107 for the combustor 3a including the spark plug 9.

In the respective first to third embodiments, the volume of the flow passage of the fuel flowing through the fuel pipe 107 for the combustor 3a including the ignitor is set greater than the volume of the flow passage of the fuel flowing through the fuel pipe 106 for the combustor 3b not including the ignitor. Thereby, the fuel injection timings in the respective combustors 3a and 3b are differentiated from one another. However, in the gas turbine, the amount of combustion air from the compressor 1 varies depending upon the conditions of, for example, atmospheric temperature and humidity. Hence, in the case of a gas turbine installed in a district where the differences in the atmospheric temperature and humidity are large over a year, it is contemplated that also the fuel flow amount necessary for ignition is variable depending upon the conditions. Hence, in the case of each of the embodiments, there is a probability that ignition failure is caused depending upon the conditions of the atmospheric temperature and humidity.

However, in the present embodiment, the opening of the control valve 115 provided to the fuel pipe 107 for the combustor 3a including the ignitor and of the purge air shut-off valve 109 provided to fuel purge system, and the transmission timing of the ignition instruction signal are controlled in accordance with signals issued from a control device 200. The atmospheric temperature and humidity are input into the control device 200.

More specifically, the opening of the control valve 115 is controlled in accordance with the atmospheric temperature and humidity input into the control device 200. Further, also for the amount of air necessary for fuel purge, which is executed after the gas turbine has stopped, the opening of the purge air shut-off valve 109 is regulated by the control device 200. Thus, there can be provided the combustor with even higher reliability in which the transmission timing of the ignition instruction signal and the operation of the control valve 115 are controlled to thereby enable the fuel injection timing to be optionally regulated without impairing the ignition properties even when the fuel flow amount necessary for ignition is variable depending upon, for example, atmospheric conditions.

INDUSTRIAL APPLICABILITY

The present invention can be widely applied not only to gas turbine combustors but also to combusting systems each configured to include multiple combustors. Further, as the fuel to be used for the combusting system, any one of liquid fuel and gas fuel can be used.

What is claimed is:

1. A combusting system comprising:
a plurality of combustors each including a fuel pipe that supplies fuel to a fuel nozzle, and a fuel purge system connected to the fuel pipe, wherein adjacent ones of the plurality of combustors are interconnected through a cross fire tube, and some of the plurality of combustors each include a ignitor; and
means for delaying a start time of fuel injection from the combustion nozzle of the combustor including the ignitor from fuel injection from the combustion nozzle of the combustor not including the ignitor such that a timing at injection of fuel from the fuel nozzle of the combustor with the ignitor is set to be later compare to the combustor not including the ignitor.

2. A combusting system according to claim 1, further comprising a three-way valve provided upstream of a connection portion between the fuel pipe of and the fuel purge system of the combustor including the ignitor, wherein a tank for storing purged fuel is connected to one end of the three-way valve.

3. A combusting system according to claim 1, wherein the fuel nozzle in each of the combustor including the ignitor and the combustor not including the ignitor is a pilot burner of a diffusion combustion type, wherein a premixer is disposed on a circumference of the pilot burner.

4. A combusting system comprising a plurality of combustors each including a fuel pipe that supplies fuel to a fuel nozzle that injects the fuel, and a fuel purge system connected to the fuel pipe, wherein adjacent ones of the plurality of combustors are interconnected through a cross fire tube, and some of the plurality of combustors each include a ignitor,
wherein a volume of a flow passage of the fuel flowing through the fuel pipe extending from a connection portion between the fuel pipe and the fuel purge system to a discharge portion that discharges purged fuel to the outside in the combustor including the ignitor is greater than the volume of a flow passage of the fuel flowing through the fuel pipe in an identical section in the combustor not including the ignitor such that a timing at injection of fuel from the fuel nozzle of the combustor with the ignitor is set to be later compare to the combustor not including the ignitor.

5. A combusting system comprising:
a plurality of combustors each including a fuel pipe that supplies fuel to a fuel nozzle, a fuel purge system that discharges the fuel residual in the fuel pipe to an outside of the fuel pipe, and a connection portion between the fuel pipe and the fuel purge system, wherein adjacent ones of the plurality of combustors are interconnected through a cross fire tube, and some of the plurality of combustors each include a ignitor; and
a flow divider that distributes fuel to a plurality of the pipes, the fuel being supplied from a fuel tank,
wherein a volume of a flow passage of the fuel flowing through the fuel pipe extending from the connection portion between the fuel pipe and the fuel purge system to a discharge portion that discharges a purged fuel to the outside in the combustor including the ignitor is greater than the volume of a flow passage of the fuel flowing through the fuel pipe in an identical section in the combustor not including the ignitor such that a timing at injection of fuel from the fuel nozzle of the combustor with the ignitor is set to be later compare to the combustor not including the ignitor.

* * * * *